United States Patent
Yoshida (10) Patent No.: US 6,529,711 B1
(45) Date of Patent: Mar. 4, 2003

(54) TERMINAL FOR WIRELESS COMMUNICATION

(75) Inventor: Kenichi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,141

(22) Filed: May 26, 1999

(30) Foreign Application Priority Data

May 29, 1998 (JP) ............................................. 10-148803

(51) Int. Cl.[7] .............................. H04B 1/38; G06E 13/24; G06E 13/26
(52) U.S. Cl. ...................... 455/73; 710/262; 710/264; 710/260
(58) Field of Search .......................... 455/73, 418, 419, 455/550; 710/260, 262, 264, 265, 266, 129, 263; 711/6, 113, 118, 123, 125, 126, 151, 158; 712/32, 42, 233, 40; 715/260–269

(56) References Cited

U.S. PATENT DOCUMENTS 5,867,726 A * 2/1999 Ohsuga et al. ................. 712/32
5,944,809 A * 8/1999 Olarig et al. ................. 710/260
5,983,310 A * 11/1999 Adams ........................... 711/6
5,987,556 A * 11/1999 Nakagawa et al. .......... 710/260

FOREIGN PATENT DOCUMENTS

| JP | 59-99553 | 6/1984 |
| JP | 5-28040 | 2/1993 |
| JP | 5-158821 | 6/1993 |
| JP | 8-8817 | 1/1996 |

* cited by examiner

Primary Examiner—Tracy Legree
(74) Attorney, Agent, or Firm—Whitham, Curtis & Christofferson, P.C.

(57) ABSTRACT

When a request for reception of radio signals is delivered by wireless communication section 3, subordinate processing portion 12 fetches programs necessary for reception of radio data from external memory 2 and stores them into command cache memory 13. At this instant, to prevent data stored in command cache memory 13 from being altered by other interrupt requests, the system instructs interrupt controller 16 to mask all interrupt requests except urgent ones. Through this arrangement it is possible to reduce noise during execution of a specific processing, particularly during reception of data.

8 Claims, 6 Drawing Sheets

TERMINAL FOR WIRELESS COMMUNICATION

BACKGROUND OF THE INVENTION

1. Field of the Invention

This invention relates to a terminal for wireless communication, particularly to reduction of noise during the reception of data through a wireless network.

2. Description of Related Art

With regard to a terminal for wireless communication incorporating digital parts such as a microprocessor to control a section for wireless communication, noise developed in those digital parts may adversely affect the operation of the section for wireless communication. Conventional techniques to avoid such adverse effects inflicted by noise consist of, for example, shielding an interface between the section for wireless communication and the digital parts, or of arresting all activities except the reception of data during the reception of data which is particularly sensitive to noise. On the other hand, recently, improvement of the processing activity of a terminal for wireless communication is required, and microprocessors operating at a high speed come to be used. Thus, development of noise is all the more problematic. The major factor leading to the development of noise is access to an external memory.

A technique whereby opportunities for the access to an external memory are reduced to thereby lessen the development of noise is disclosed in Japanese Patent Laid-Open No. 5-158821. According to the technique disclosed in this publication, an internal cache memory is introduced in a chip representing a microprocessor, and connection of the microprocessor with an external element is put to an inactive state if a function is called for that requires arrest of noises, and necessary processing is achieved solely depending on programs and data stored in the internal cache memory. The same publication calls such action mode as "single chip mode" or "single mode", and another action mode in which access to an external memory is permitted as "expanded mode". During operation depending on the single chip mode, access to an external memory is arrested, and thus the development of noise is greatly reduced.

However, according to the technique disclosed in the above publication, it is necessary for part of an internal cache memory to have a dedicated RAM and ROM. Although currently general-purpose microprocessors containing an internal cache memory are available in the market, such a microprocessor has a function to automatically load commands or data into an internal cache memory and thus may alter on its own accord the data stored in the internal cache memory at the time when it makes an access to an external memory. To prevent such alteration of data, according to the technique disclosed in the publication, introduction of a RAM and ROM usable only during single chip mode becomes essential. Introduction of such a RAM and ROM would not only limit the memory capacity of cache memory usable during expanded action mode, to thereby lower the processing speed, but also increase the production cost of the chip.

SUMMARY OF THE INVENTION

This invention aims at providing a terminal for wireless communication which is free from all the problems described above, and is capable of suppressing the development of noise during operations sensitive to noise, particularly during reception of data, although it incorporates a general-purpose microprocessor, and a method enabling such operation.

The terminal for wireless communication of this invention comprises a wireless communication section to transmit/receive radio signals, and a microprocessor to control the transmission/reception of radio signals performed by the wireless communication section; the microprocessor comprises a cache memory to store processing programs which are necessary for the operation of the microprocessor, and an interrupt controller to deal with an external request for interrupt; and the interrupt controller, while the microprocessor engages in a certain specific operation solely dependent on processing programs stored in the cache memory without making an access to an external element, for example, engages in the processing of incoming signals, and when it receives a request for interrupt from outside, masks the request whenever it finds that the request is inferior in priority to the above specific operation, and permits the microprocessor to keep on engaging in the same operation without interruption.

Namely, whenever the microprocessor engages in an operation very sensitive to noise, particularly when it engages in the processing of incoming signals, all other requests than urgent one are rejected even when the microprocessor has a surplus capacity for processing. Through this mode of operation, it becomes unnecessary for the microprocessor to get access to an external memory to process a request for interrupt, and for programs necessary for treating incoming signals to be reloaded into the cache memory which would be required if the content of the cache memory were altered as a result of an operation necessary for the treatment of the request for interrupt.

If the system engages in transmission and reception of signals alternately, it is desirable to transmit signals without altering programs necessary for reception of signals in a cache memory. For this purpose, if the cache memory has a sufficient capacity, the programs necessary for transmission of signals may be stored in an area within the cache memory different from the programs necessary for reception of signals. If the cache memory does not have a sufficient capacity, necessary commands may be fetched from an external memory as required.

For necessary commands to be fetched from an external memory as required, processing programs should be stored in a non-cache area of the external memory. If a program is designed in a usual manner, a compiler automatically works not to consume a non-cache area for storage of the program as much as possible because use of non-cache area for storage of a program would result in a reduced processing capacity. With this invention, however, use of a non-cache area is positively tried.

Part of microprocessors commercially available confers a function called cache lock to at least a certain area of cache memory so that a program there may be firmly fixed and resistive to alteration. If the system incorporates such a microprocessor, an area to store programs for a certain specific operation should be preferably locked.

For such a terminal for wireless communication to operate, a processing program to instruct a section for wireless communication to exercise a certain specific operation is loaded into a cache memory within a microprocessor; the microprocessor exercises the specific operation following the program in the cache memory without getting access to an external element; and, when it receives a request for interrupt during the operation, it compares the specific operation and the request for interrupt for priority; and whenever it finds that the request for interrupt is inferior in priority to the specific operation, it masks the request for interrupt, and keeps on exercising the specific operation without needing to getting access to an external element.

BRIEF DESCRIPTION OF THE DRAWINGS

Examples of this invention will be described below with reference to following figures.

DETAILED DESCRIPTION OF THE PREFERRED EMBODIMENTS

Figure 1:
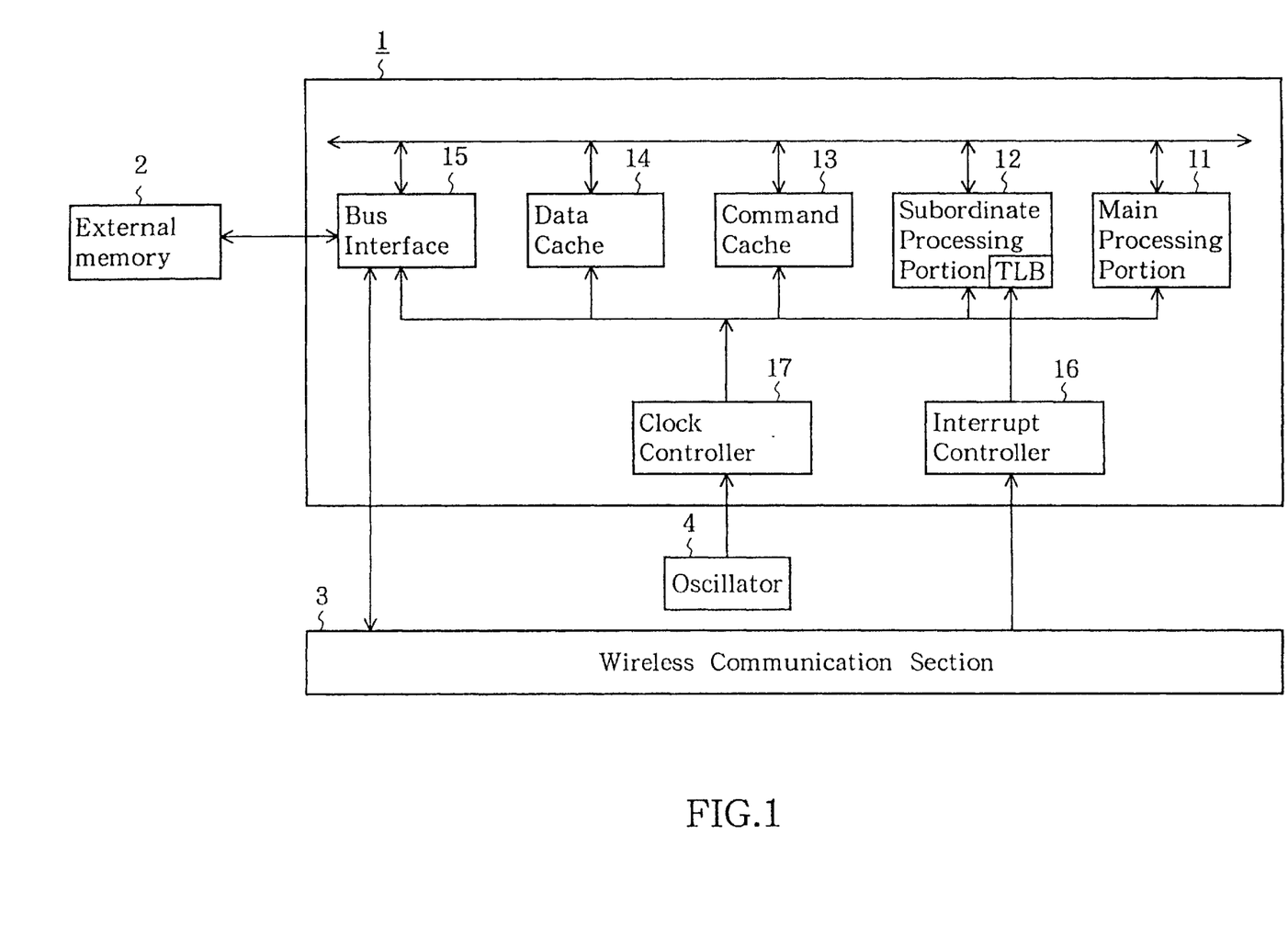
FIG. 1 is a diagram to illustrate the system constitution of a first example of this invention.

A terminal for wireless communication representing an example of this invention and depicted in FIG. 1 comprises microprocessor 1, external memory 2, wireless communication section 3 and oscillator 4; and in microprocessor 1 there are provided main processing portion 11, subordinate processing portion 12, command cache memory 13, data cache memory 14, bus interface 15, interrupt controller 16 and clock controller 17.

Microprocessor 1 operates using incoming clocks from oscillator 4 as referential clock. External memory 2 is connected through a memory bus to bus interface 15 in microprocessor 1, and receives/delivers data under the control of microprocessor 1. Wireless communication section 3 is connected through an interrupt signal line to interrupt controller 16 in microprocessor 1, and then through a data signal line to bus interface 15 in microprocessor 1.

Main processing portion 11 of microprocessor 1 performs processing of data, and analysis and execution of instructions. Subordinate processing portion 12 executes management of a memory and processing of exceptional operations. Command cache memory 13 memorizes execution programs. Data cache memory 14 memorizes various kinds of data. Bus interface 15 controls accesses to external memory 2, and exchanges data with wireless communication section 3. Interrupt controller 16 receives a request for interrupt from outside, and, when it finds that the request must be responded, it delivers it to subordinate processing portion 12 to put the interrupt into practice. Clock controller 17 takes clocks fed by oscillator 4 as referential clocks, and provides action clocks to all elements of microprocessor 1. In addition, main processing portion 11, subordinate processing portion 12, command cache memory 13, data cache memory 14 and bus interface 15 can exchange data with each other through an internal data bus.

Figure 2:
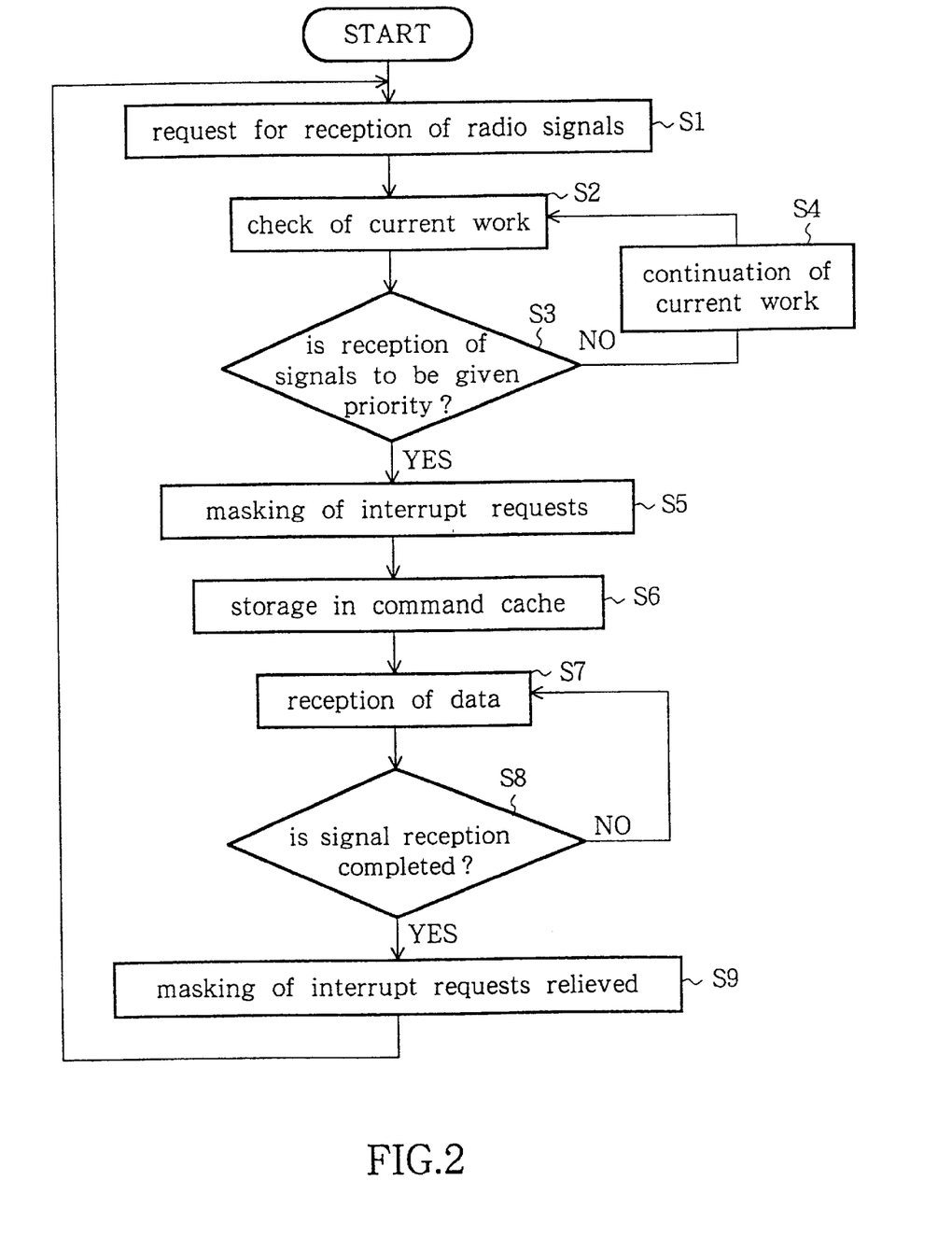
FIG. 2 is a flowchart to illustrate operations followed from the time when a request for reception of radio data is delivered till the time when reception of data is completed.

The manner how this example receives signals will be described with reference to the process flowchart of FIG. 2. FIG. 2 presents operations executed by the terminal from the time when a request for reception of radio data is delivered until the time when reception of data is completed. Determination of priority order is performed by interrupt controller 16, and, via operation of subordinate processing portion 12, interrupt controller 16 masks a request for interrupt inferior in priority order.

Assume, for example, priority order occurs as follows:
1. Request for interrupt on account of shortage of power of a cell or of opening of the lid of a cell;
2. Request for interrupt for temporary withdrawal or termination of data reception; and
3. Request for interrupt for other reasons (for example, request for interrupt through an input fed via a keyboard).

Assume a case where a request is delivered while reception of data through a wireless network is underway: if the request belongs to No. 1 or No. 2 category described above, subordinate processing portion 12 is allowed to recognize it to achieve an interrupt; and if the request belongs to No. 3 category, interrupt controller 16 masks it so that the same portion can not recognize it.

Assume that, while the system engages in a certain processing work, a request for reception of data through a wireless network is delivered (S1). Instantly, the system checks what work it is engaging in now (S2). Then, the system checks which should be given a priority, the current work or reception of radio data (S3). For the system to make a proper judgment, it is necessary to allot in advance priority orders to individual processing works. If the system determines the current work should be given priority over reception of radio data, it continues to do the same work, and withdraws the request for reception of radio data (S4). On completion of the processing work the system has determined to be given priority over reception of radio data, the system instructs interrupt controller 16 to mask all interrupt requests that are lower in rank than reception of radio data (S5). This is because, otherwise if an interrupt request lower in rank than reception of radio data were delivered, it would achieve an interrupt to introduce an exceptional processing work, and then signal reception programs stored in command cache memory 13 might be destroyed. Immediately thereafter, the system gets access to external memory 17, fetches radio data reception programs and stores them into command cache memory 13 (S6). On completion of storage, the system starts a processing work necessary for reception of radio data (S7). On completion of reception of radio data (S8), the system withdraws the mask applied to interrupt requests that are lower in priority order (S9), to resume the ordinary working condition.

Assume, for example, a request for reception of radio data is delivered by wireless communication section 3. Subordinate processing portion 2 transfers programs necessary for reception of radio data from external memory 2 to command cache memory 13, to store them there. At this instant, to prevent the data stored in command cache memory 13 from being altered by other interrupt requests, the system instructs interrupt controller 16 to mask all interrupt requests except essential ones. As a result, the system, during processing radio data reception programs, can obviate the need for fetching data necessary for execution of the programs from external memory 2, and thus accesses by microprocessor 1 to the external memory are reduced, which makes it possible to reduce noise during reception of signals.

Figure 3:
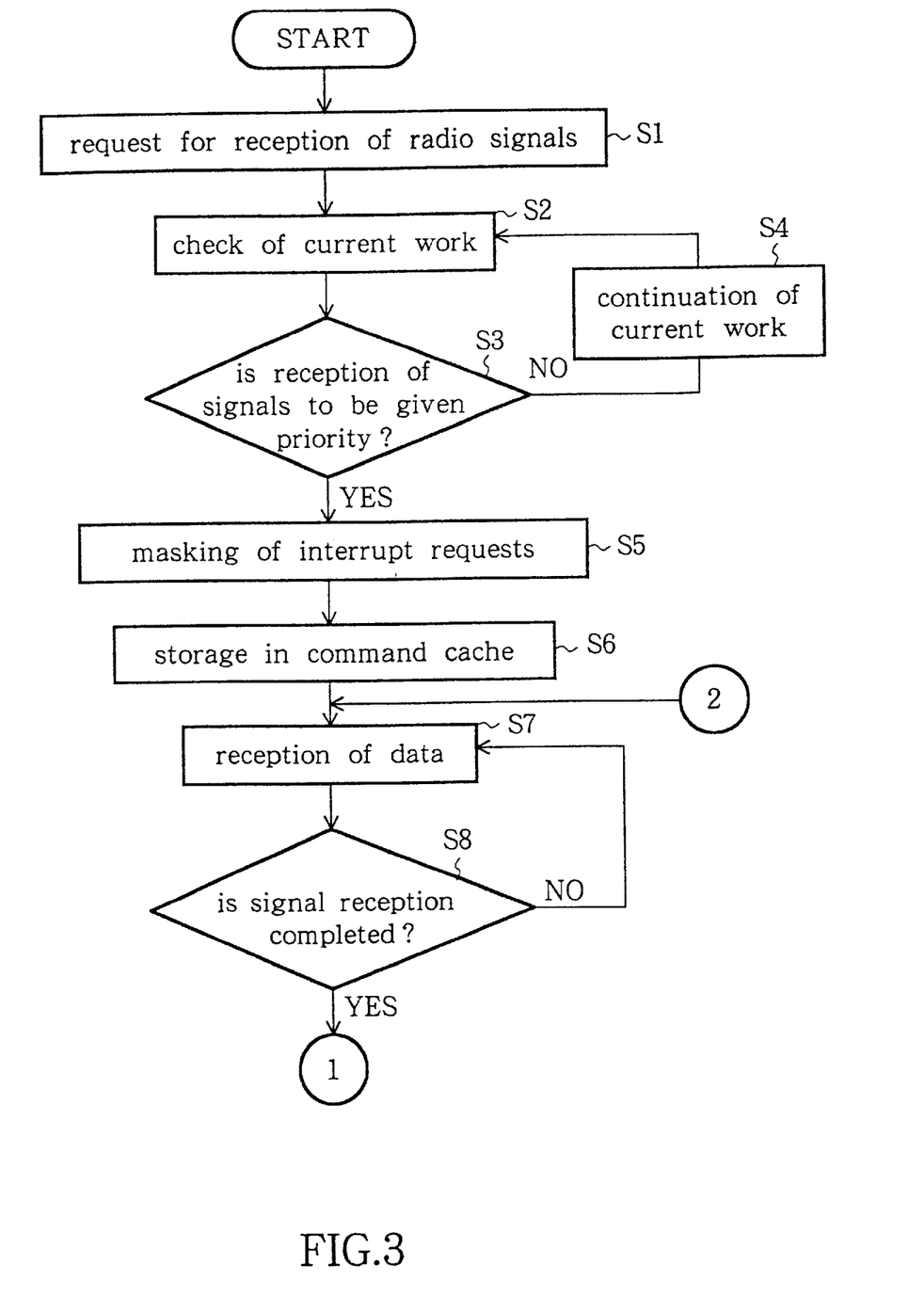
FIG. 3 is a flowchart of part of processes required when alternate transmission and reception of signals are performed.
Figure 4:
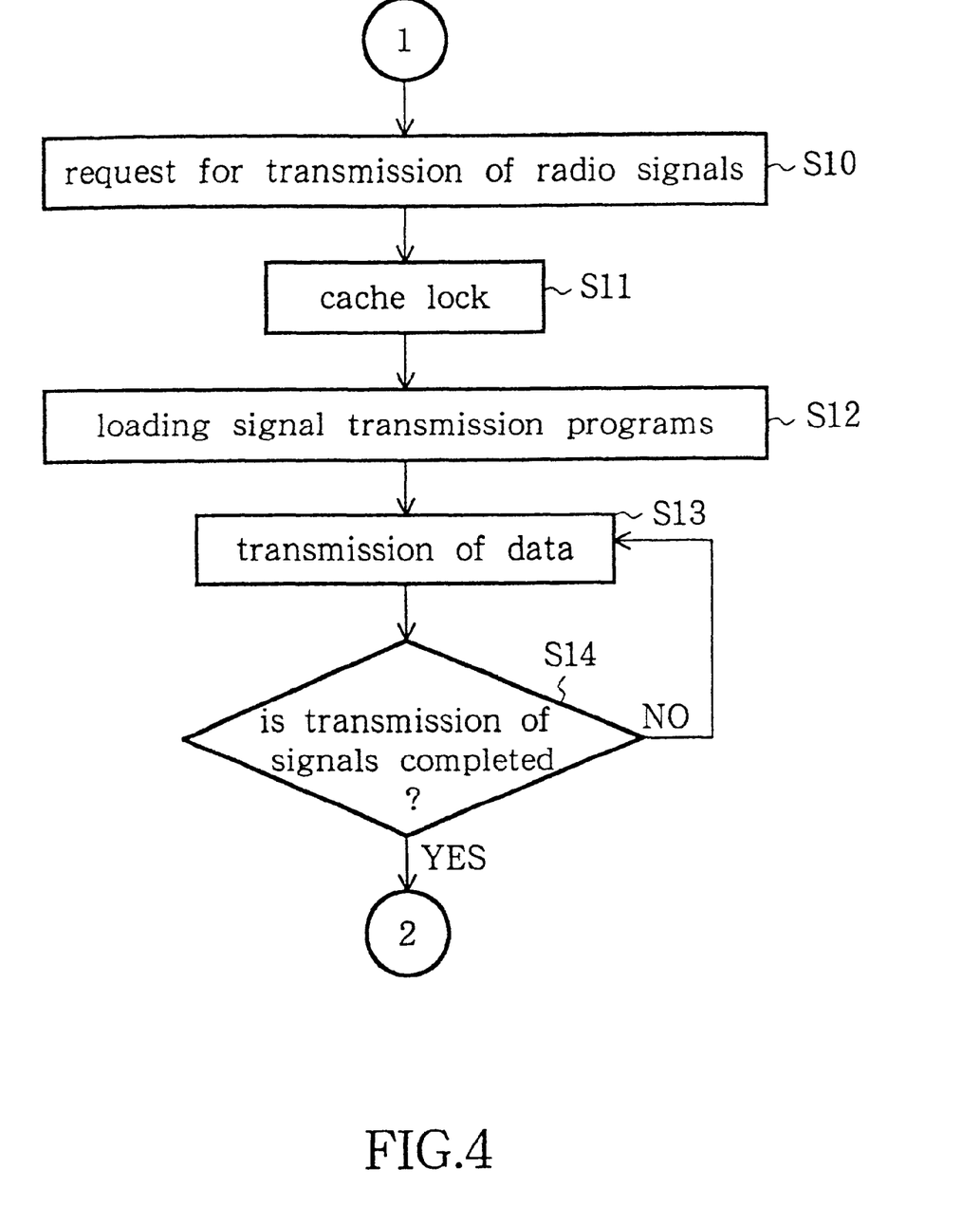
FIG. 4 is a flowchart of the processes consequent to the processes depicted in FIG. 3.
Figure 5:
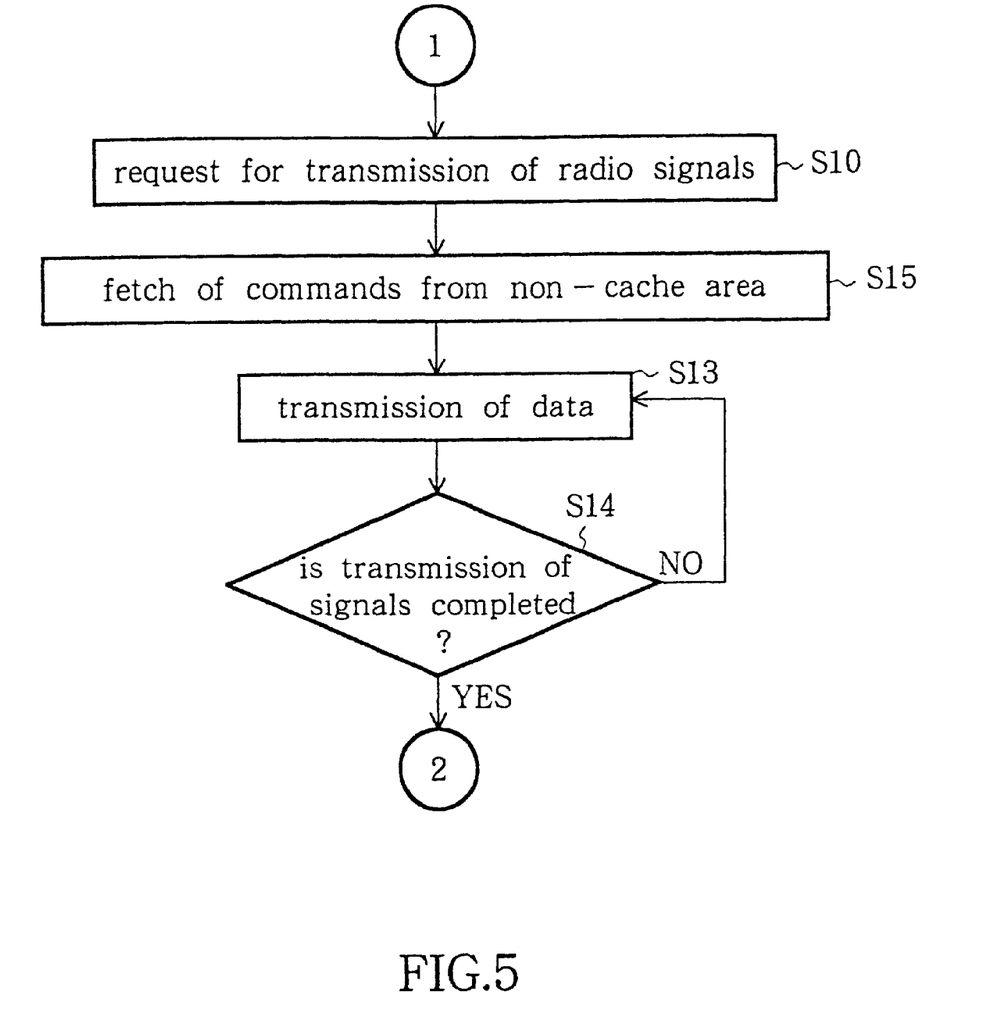
FIG. 5 is a flowchart of another kind of processes consequent to the processes depicted in FIG. 3.

How processing works proceed while the system engages in transmission/reception of signals will be described below with reference to FIGS. 3, 4 and 5.

Firstly, assume, while the system engages in a certain processing work, a request for reception of radio signal is delivered (S1). Instantly, the system checks what work it is engaging in now (S2). Then, the system checks which should be given a priority, the current work or reception of radio data (S3). For the system to make a proper judgment, it is necessary to allot in advance priority orders to individual processing works. If the system determines the current work should be given priority over reception of radio data, it continues to do the same work, and withdraws the request for reception of radio data (S4). On completion of the processing work the system has determined to be given priority over reception of radio data, the system instructs the interrupt controller 16 to mask all interrupt requests that are lower in rank than reception of radio data (S5). This is because, otherwise if an interrupt request lower in rank than reception of radio data were delivered, it would achieve an interrupt to introduce an exceptional processing work, and then signal reception programs stored in command cache memory 13 might be destroyed. Immediately thereafter, the system gets access to external memory 2, fetches radio data reception programs and stores them into command cache memory 13 (S6). On completion of storage, the system starts a processing work necessary for reception of radio data (S7). On completion of reception of radio data (S8), the system switches to transmission of data.

What is described above concerns with the processing work involved in the reception of radio data, and is practically the same with what is represented by the flowchart of FIG. 2. The last mentioned example, however, is different in that, while the mask applied to interrupt requests is kept untouched, the system operation switches to transmission of radio data.

To engage in transmission of radio data, it is necessary for the system to fetch radio data transmission programs from external memory 2. During this operation, the system, to prevent radio data reception programs stored in command cache memory 13 from being altered, applies a fixation treatment on an area where the radio data reception programs have been stored, that is, applies a cache lock to that area. Namely, when a request for transmission of radio signals is delivered (S10), the system executes cache lock (S11), and loads radio data transmission programs into the command cache memory (S12) as shown in FIG. 4. What is fixed by the cache lock only includes the area where radio data reception programs have been stored, and other areas are freely usable.

Next, transmission of data occurs (S13). Incidentally, because transmission of radio data is less affected with noise, it is unnecessary to arrest the operation of other blocks. However, for fear that introduction of an exceptional operation may alter radio data reception programs stored in cache, radio data transmission programs are used while the mask is kept applied. It is possible, however, to do another processing work during transmission of signals. In this case, execution of another program is only permitted as long as transmission of radio data occurs and only areas of cache memory other than that kept under cache lock are used. On completion of data transmission (S14), the system resumes the original condition ready for reception of data.

It is also possible for the system, instead of resorting to cache lock, to store radio data transmission programs into a non-cache area. A flow of processes necessary for this operation are shown in FIG. 5. In this case, the system has stored radio data transmission programs into a non-cache area of external memory 17, and, each time it receives a request for transmission of radio signals (S10), it fetches commands necessary for execution of the radio data transmission programs from external memory 17 and loads them into the microprocessor (S15). Because radio data transmission programs are stored in a non-cache area, they are not available to easy accesses as in a cache, and thus the risk of the radio data reception programs being altered by data newly loaded is avoided.

Figure 6:
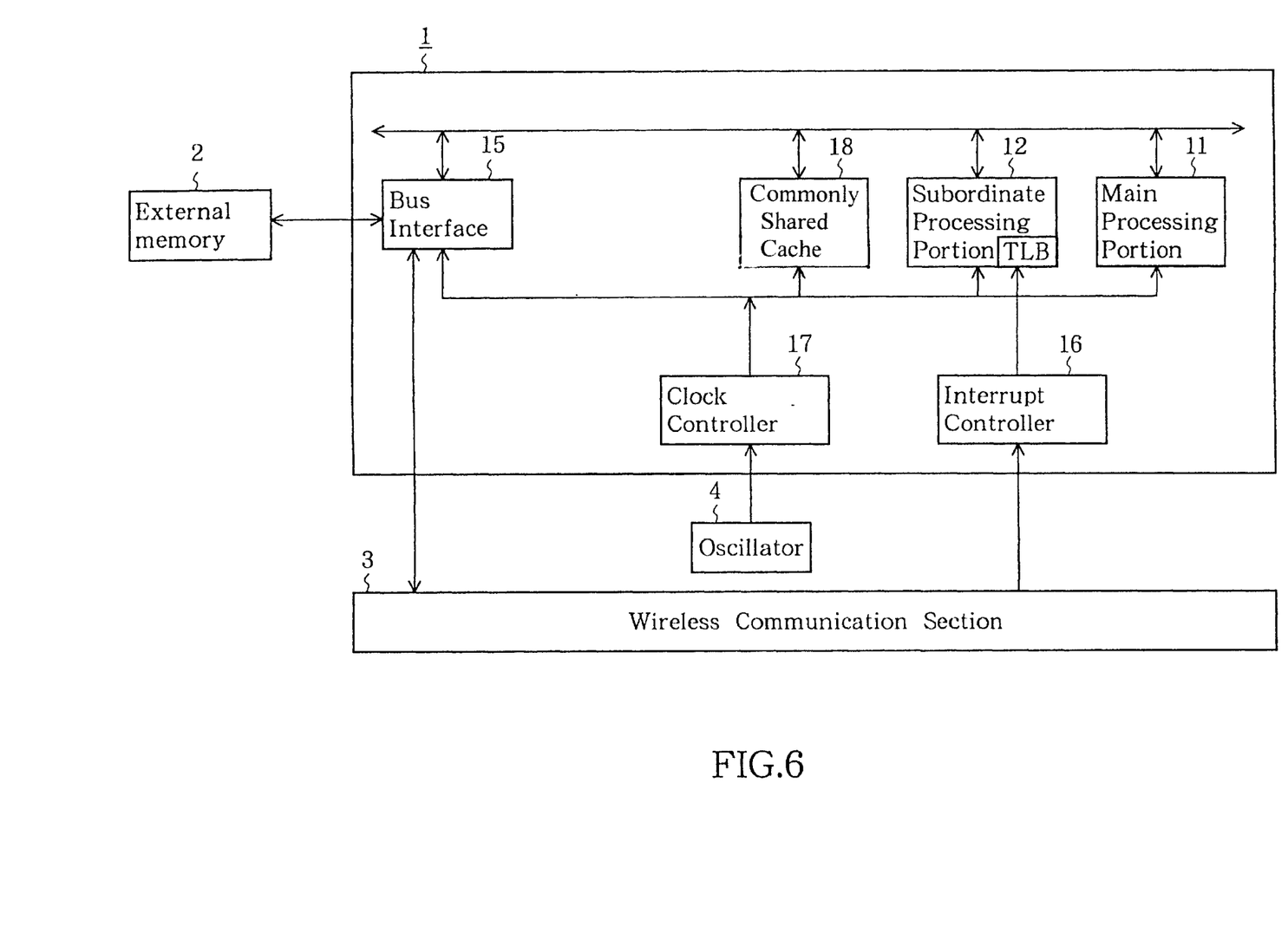
FIG. 6 is a diagram to illustrate the constitution of a second example of this invention.

FIG. 6 is a diagram to illustrate the constitution of a second example of this invention. In this example, instead of command cache memory 13 and data cache memory 14 of the first example, commonly shared cache memory 18 is introduced. The operation of the system is the same with the first example, but it will be effective to introduce a cache lock mechanism whereby it is possible to use individual areas of common cache memory 18 in a fixed manner, because it will prevent programs stored in the cache from being exchanged with each other before an operation requiring the programs is executed.

As detailed above, according to this invention, when the system executes a function for the proper achievement of which suppression of noise is essential, particularly during reception of signals, necessary processing is achieved according to programs stored in an internal cache memory, and other processing works than urgent ones are not permitted even when a microprocessor has a surplus handling capacity. Through this arrangement it is possible to obviate the need for getting access to an external memory for execution of a program if an interrupt request is accepted, and for reloading the content of cache memory on completion of the program which would otherwise be required because the content would be altered during execution of the program, thereby to reduce the opportunities for getting access to an external memory and to reduce the opportunities of noise development. Particularly, this arrangement makes it possible to suppress the development of noise during reception of radio signals, and thus to prevent the lowering of signal reception sensitivity.

If an interrupt request is accepted without scruple, not only the handling capacity of a microprocessor is consumed for the treatment of the request, but fetch of a program necessary for execution of the request, and reloading the cache memory which would be altered during execution of the program become necessary, which will greatly impair the handling capacity of the system. In contrast with this, the system of this invention masks an interrupt request which is lower in priority order, and thus can direct the handling capacity of a microprocessor only to specific operations. Accordingly, if, for example, the system engages in reception of signals, it continues the same operation without being interrupted by an interrupt request even if such a request sets in during reception of signals, and thus it encounters less chances of missing data during the reception operation.

This invention can be applied to a system incorporating a general-purpose microprocessor. Because of this, it is possible not only to reduce cost involved in the purchase of parts and but to easily modify and exchange programs.

What is claimed is:
1. A terminal wireless communication comprising;
 a section for wireless communication to receive/transmit radio signals, and
 a microprocessor to control the reception/transmission of radio signals by this wireless communication section wherein:
  the microprocessor has a cache memory to memorize a processing program necessary for the operation of microprocessor, and an interrupt controller to handle an interrupt request from outside; and
  the interrupt controller, when it receives and interrupt request from outside while the microprocessor engages in a specific processing by getting access to a processing program memorized by the cache memory, and it finds the interrupt request to be lower in priority order that the specific processing, masks the request for interrupt treatment, and continues the current specific processing without interruption.

2. A terminal for wireless communication as described in claim 1 wherein the specific processing is reception of signals.

3. A terminal for wireless communication as described in claim 2 wherein, when processing for signal transmission and processing for signal reception are alternated, processing for signal transmission is achieved without adding any alteration to a program stored in the cache memory and necessary for signal reception.

4. A terminal for wireless communication as described in claim 1 comprising a cache lock means to fix at least part of the cache memory thereby preventing it from being altered wherein an area where a processing program necessary for execution of the specific processing is kept under cache lock.

5. An operation method for a terminal for wireless communication including steps of:

loading a processing program necessary for instructing a section for wireless communication to execute a specific processing into a cache memory within a microprocessor;

executing processing on said microprocessor according to the processing program by getting access to the cache memory;

comparing a priority order for the specific processing when a request requiring interrupt treatment is delivered during execution of the specific processing;

masking the request for interrupt treatment when it finds the request for interrupt treatment is lower in priority order that the specific processing; and continuing the current specific processing by getting access to the cache memory.

6. An operation method as described in claim 5 wherein the specific processing is reception of signals.

7. An operation method as described in claim 6 wherein, when processing for signal transmission and processing for signal reception are alternated, processing for signal transmission is achieved without adding any alteration to a program stored in the cache memory and necessary for signal reception.

8. An operation method for a terminal for wireless communication as described in claim 5 whereby a fixed area is introduced in cache region, and a processing program necessary for the specific processing is stored in the fixed area.

* * * * *